(12) United States Patent
Freidank et al.

(10) Patent No.: US 9,890,895 B2
(45) Date of Patent: Feb. 13, 2018

(54) PIPELINE WITH HEAT-STORING PROPERTIES

(71) Applicant: BASF SE, Ludwigshafen (DE)

(72) Inventors: Daniel Freidank, Shanghai (CN); Dejan Petrovic, Osnabrueck (DE); Wei Leng, Shanghai Yang Pu (CN); Julia Liese, Bremen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/036,387

(22) Filed: Sep. 25, 2013

(65) Prior Publication Data

US 2014/0093668 A1    Apr. 3, 2014

Related U.S. Application Data

(60) Provisional application No. 61/708,069, filed on Oct. 1, 2012.

(51) Int. Cl.
| | | |
|---|---|---|
| B05D 3/02 | (2006.01) | |
| F16L 59/15 | (2006.01) | |
| C09D 5/26 | (2006.01) | |
| F16L 59/14 | (2006.01) | |
| F28D 20/02 | (2006.01) | |

(52) U.S. Cl.
CPC ............... F16L 59/15 (2013.01); C09D 5/26 (2013.01); F16L 59/14 (2013.01); F28D 20/023 (2013.01); Y02E 60/145 (2013.01); Y02E 70/30 (2013.01); Y10T 428/1352 (2015.01)

(58) Field of Classification Search
CPC .. C09D 5/26; F16L 59/15; F16L 59/14; F28D 20/023; Y10T 428/1352; Y02E 70/30; Y02E 60/145
USPC ...................................................... 427/385.5
See application file for complete search history.

(56) References Cited

U.S. PATENT DOCUMENTS

| | | | |
|---|---|---|---|
| 6,000,438 A | 12/1999 | Ohrn | |
| 6,265,524 B1 | 7/2001 | Takemoto et al. | |
| 6,955,778 B2 * | 10/2005 | Huntemann | 264/45.3 |
| 2004/0026653 A1 * | 2/2004 | Bonnet | C08G 18/69 |
| | | | 252/62 |
| 2007/0240781 A1 | 10/2007 | Huntemann et al. | |
| 2011/0065840 A1 * | 3/2011 | Freidank et al. | 524/5 |

FOREIGN PATENT DOCUMENTS

| | | | | |
|---|---|---|---|---|
| CN | 101545565 A | 9/2009 | | |
| CN | 101706223 A | 5/2010 | | |
| CN | 201785363 U | 4/2011 | | |
| DE | 102 56 550 A1 | 6/2004 | | |
| EP | 2226344 A1 * | 9/2010 | | C08G 18/48 |
| FR | 2 853 388 A1 | 10/2004 | | |
| JP | 10-267980 A | 10/1998 | | |
| WO | WO 99/03922 A1 | 1/1999 | | |
| WO | WO 02/16733 A1 | 2/2002 | | |
| WO | WO 02/34809 A1 | 5/2002 | | |
| WO | WO 02/063918 A2 | 8/2002 | | |
| WO | WO 02/072701 A1 | 9/2002 | | |
| WO | WO 2004/003424 A1 | 1/2004 | | |
| WO | WO 2005/113631 A1 | 12/2005 | | |
| WO | WO 2009/138379 A2 | 11/2009 | | |
| WO | WO 2010/029627 A1 | 3/2010 | | |

OTHER PUBLICATIONS

English translation of the disclosure of EP 2226344.*

* cited by examiner

*Primary Examiner* — Robert S Walters, Jr.
(74) *Attorney, Agent, or Firm* — Oblon, McClelland, Maier & Neustadt, L.L.P.

(57) ABSTRACT

The present invention relates to a process for producing pipelines with heat-storing properties, in which a) organic polyisocyanate is mixed with b) at least one polymeric compound having at least two isocyanate-reactive hydrogen atoms, c) optionally chain extender and/or crosslinker, d) catalyst, e) wax and f) optionally other assistants and/or additives, to give a first reaction mixture, and the first reaction mixture is applied to a pipe and allowed to react fully to give a first polyurethane layer. The present invention further relates to a pipeline with heat-storing properties obtainable by such a process.

10 Claims, No Drawings

PIPELINE WITH HEAT-STORING PROPERTIES

The present invention relates to a process for producing pipelines with heat-storing properties, in which a) organic polyisocyanate is mixed with b) at least one polymeric compound having at least two isocyanate-reactive hydrogen atoms, c) optionally chain extender and/or crosslinker, d) catalyst, e) wax and f) optionally other assistants and/or additives, to give a first reaction mixture, and the first reaction mixture is applied to a pipe and allowed to react to give a first polyurethane layer. The present invention further relates to a pipeline with heat-storing properties obtainable by such a process.

Typically, crude oil is present in the ground at temperatures of greater than 40° C. and in some cases at temperatures of up to more than 100° C. At these temperatures, the crude oil has good flowability and can be produced easily. The offshore production of crude oil is more problematic. After emerging from the well, the crude oil has to be conducted through cold water at a temperature of about 4° C., in some cases for several hundred meters, before it reaches the water surface. In the production of crude oil, there may be brief shutdowns in oil production for technical reasons. If the production pipeline is not isolated, the crude oil in the pipeline cools rapidly and can block the pipeline.

In order to prevent this, pipelines are frequently surrounded by an insulating layer. Such insulated pipelines are known and are described, for example, in WO 99/3922 or WO 02/72701. The latter involve dispersion of hollow glass microspheres in an elastomeric polymer material, which form a pressure-resistant insulating layer which can withstand even the water pressure at great depth.

The risk of blockage of offshore pipelines by cooling of the crude oil present therein in the case of a brief production stoppage has been reduced further by the use of encapsulated latent heat stores. For example, WO 2005113631 describes an offshore pipeline comprising polyurethane insulation, this polyurethane insulation comprising hollow microspheres and encapsulated latent heat stores. The encapsulated latent heat stores used are lipophilic substances having a solid/liquid transition above 20° C., usually waxes, present encapsulated in a shell made of polymerized material, for example, a thermoset polymer, such as formaldehyde resins, polyureas and polyurethanes, and highly crosslinked methacrylate polymers. In the course of crude oil production, the latent heat stores absorb heat from the warm crude oil and melt. In the case of a brief production stoppage, the insulating layer cools gradually from the outside, and the lipophilic filling of the latent heat stores cools, solidifies and releases the heat absorbed back to the crude oil. Similar solutions are described in DE 10256550, WO 2004003424, U.S. Pat. No. 6,000,438, WO 2002016733, US20070240781 or CN 101545565. This encapsulation prevents the latent heat store from being expelled from the polyurethane solution over time.

A disadvantage of the encapsulated latent heat stores is that only comparatively small amounts of latent heat stores can be incorporated into the matrix material since the reaction mixture can no longer be processed owing to the high viscosity, and the mechanical properties of the insulating layer also decline significantly. Thus, in this process, typically not more than 20% by weight of latent heat stores are incorporated into the polymer matrix, which, after subtraction of the encapsulation material, corresponds to an effective content of heat-storing waxes of not more than 15% by weight. This leads to only a low heat storage capacity and thus, owing to the small release of heat, only to a brief extension of possible production stoppages without a risk of blockage for the pipelines.

In order to be able to absorb greater amounts of heat and hence to enable longer production stoppages without blockage of the pipelines, "pipe in pipe" solutions have been described. For these "pipe in pipe" solutions, the production pipe is surrounded by a second pipe of greater diameter, such that an intermediate space forms between these two pipes. In this intermediate space are the heat-storing waxes. The second pipe in turn is surrounded by an insulating layer. Such "pipe in pipe" solutions are described, for example, in CN 101706223, in WO 2010029627, FR 2853388, WO 2002063918, WO 02/34809 or CN 201785363.

However, "pipe in pipe" solutions are very inconvenient and costly and cannot be produced in a simple manner.

It was an object of the present invention to provide pipelines with heat-storing properties, which have good insulating properties and high heat-storing properties and thus keep the crude oil in the pipeline at a producible temperature for a long period in the case of a possible production stoppage, but which can also be produced in a simple manner, for example directly onboard pipe-laying ships.

The present invention is solved by a heat-insulating pipeline obtainable by a process, in which a) organic polyisocyanate is mixed with b) at least one polymeric compound having at least two isocyanate-reactive hydrogen atoms, c) optionally chain extender and/or crosslinker, d) catalyst, e) wax and f) optionally other assistants and/or additives, to give a first reaction mixture, and the first reaction mixture is applied to a pipe and allowed to react fully to give a first polyurethane layer. The wax (e) is added here directly to the reaction mixture and is not encapsulated in a shell made of glass or polymerized material.

The reaction mixture can be obtained using a wax dispersion, or else using the wax in liquid form. If wax (e) is added directly as a component for the production of the reaction mixture, this is preferably done in a mixing head, especially in a high-pressure mixing head. In this mixing head, the wax is then mixed with the further components in liquid form, for example in the molten stage. The mixing is preferably effected in such a way that wax droplets having a mean particle diameter of less than one millimeter, more preferably less than 0.5 mm and especially less than 0.1 mm are obtained. The mixing is preferably effected in a high-pressure mixing head. In a particularly preferred embodiment, the polyisocyanates (a), the wax (e) and a polyol component comprising components (b) to (d) and optionally (f) are mixed with one another in the high-pressure mixing head, the polyol component already being premixed prior to addition to the mixing head.

The wax (e) can also be added in the form of a wax dispersion. Such wax dispersions are known and are described, for example, in WO 2009/138379. The wax is preferably dispersed in at least a portion of the polymeric compound b) having at least two isocyanate-reactive hydrogen atoms and/or the chain extender and/or crosslinker c). The wax dispersion may also comprise the further components (d) and (f).

Such a wax dispersion can be obtained, for example, by combining and heating the components, such that wax (e) and the polymeric compound b) having at least two isocyanate-reactive hydrogen atoms are liquid, stirring vigorously at this temperature, such that finely distributed wax droplets are obtained, and cooling the dispersion while stirring.

Optionally, the storage stability of this dispersion is improved, or the wax content in the dispersion is increased, by using a dispersant.

The organic and/or modified polyisocyanates (a) used for production of the inventive polyurethane moldings comprise the aliphatic, cycloaliphatic and aromatic di- or polyfunctional isocyanates known from the prior art (constituent a-1) and any desired mixtures thereof. Examples are diphenylmethane 4,4'-diisocyanate, diphenylmethane 2,4'-diisocyanate, the mixtures of monomeric diphenylmethane diisocyanates and higher polycyclic homologs of diphenylmethane diisocyanate (polymer MDI), tetramethylene diisocyanate, hexamethylene diisocyanate (HDI), the mixture of hexamethylene diisocyanates and higher polycyclic homologs of hexamethylene diisocyanate (polycyclic HDI), isophorone diisocyanate (IPDI), tolylene 2,4- or 2,6-diisocyanate (TDI) or mixtures of the isocyanates mentioned. Preference is given to using tolylene diisocyanate (TDI), diphenylmethane diisocyanate (MDI) and especially mixtures of diphenylmethane diisocyanate and polyphenylene polymethylene polyisocyanates (crude MDI). The isocyanates may also be modified, for example by incorporation of uretdione, carbamate, isocyanurate, carbodiimide, allophanate and especially urethane groups.

The isocyanate component (a) can also be used in the form of isocyanate-containing isocyanate prepolymers. These polyisocyanate prepolymers are obtainable by reacting above-described polyisocyanates (a-1), for example at temperatures of 30 to 100° C., preferably at about 80° C., with polyols (a-2) to give the prepolymer. Preference is given to preparing the inventive prepolymers using 4,4'-MDI together with uretonimine-modified MDI and commercial polyols based on polyesters, for example proceeding from adipic acid, or polyethers, for example proceeding from ethylene oxide and/or propylene oxide.

Polyols (a-2) are known to those skilled in the art and are described, for example, in "Kunststoffhandbuch [Polymer handbook], volume 7, Polyurethane [polyurethanes]", Carl Hanser Verlag, 3rd edition 1993, chapter 3.1. The polyols (a-2) used are preferably the polymeric compounds having isocyanate-reactive hydrogen atoms described under b). The polyols (a-2) used are more preferably polyetherols.

Optionally, customary chain extenders or crosslinkers are added to the polyols mentioned in the course of preparation of the isocyanate prepolymers. Such substances are described hereinafter under c). The chain extender used is more preferably 1,4-butanediol, dipropylene glycol and/or tripropylene glycol. The ratio of organic polyisocyanates (a-1) to polyols (a-2) and chain extenders (a-3) is preferably selected such that the isocyanate prepolymer has an NCO content of 10 to 28%, more preferably of 14 to 24%.

Polymeric compounds having at least two isocyanate-reactive hydrogen atoms (b) have a molecular weight of at least 500 g/mol. It is possible to use all compounds which are known for polyurethane preparation and have at least two reactive hydrogen atoms and a molecular weight of at least 500 g/mol. These have, for example, a functionality of 2 to 8 and a molecular weight of 400 to 12000. For example, it is possible to use polyether polyamines and/or polyols selected from the group of the polyether polyols, polyester polyols or mixtures thereof.

The polyols used with preference are polyetherols, polycarbonate polyols and/or polyesterols having molecular weights between 500 and 12 000, preferably 500 to 6000, especially 500 to less than 3000, and preferably a mean functionality of 2 to 6, preferably 2 to 4. The polyols used are preferably exclusively polyetherols and polycarbonate polyols.

The polyetherols usable in accordance with the invention are prepared by known processes. For example, they can be prepared by anionic polymerization with alkali metal hydroxides, for example sodium or potassium hydroxide, or alkali metal alkoxides, for example sodium methoxide, sodium or potassium ethoxide or potassium isopropoxide as catalysts, and with addition of at least one starter molecule having 2 to 8, preferably 2 to 6, reactive hydrogen atoms, or by cationic polymerization with Lewis acids such as antimony pentachloride, boron fluoride etherate inter alia, or bleaching earth as catalysts. It is likewise possible to prepare polyether polyols by double metal cyanide catalysis from one or more alkylene oxides having 2 to 4 carbon atoms in the alkylene radical. It is also possible to use tertiary amines as the catalyst, for example triethylamine, tributylamine, trimethylamine, dimethylethanolamine, imidazole or dimethylcyclohexylamine. For specific end uses, it is also possible to incorporate monofunctional starters into the polyether structure.

Suitable alkylene oxides are, for example, tetrahydrofuran, 1,3-propylene oxide, 1,2- or 2,3-butylene oxide, styrene oxide, and preferably ethylene oxide and 1,2-propylene oxide. The alkylene oxides can be used individually, in alternating succession or as mixtures.

Examples of useful starter molecules include: water, aliphatic and aromatic, optionally N-mono-, N,N- and N,N'-dialkyl-substituted diamines having 1 to 4 carbon atoms in the alkyl radical, such as optionally mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine (TDA) and 4,4'-, 2,4'- and 2,2'-diaminodiphenylmethane (MDA) and polymeric MDA. Useful starter molecules also include: alkanolamines, for example ethanolamine, N-methyl- and N-ethylethanolamine, dialkanolamines, for example diethanolamine, N-methyl- and N-ethyldiethanolamine, trialkanolamines, for example triethanolamine, and ammonia. Preference is given to using polyhydric alcohols such as ethanediol, 1,2- and 2,3-propanediol, diethylene glycol, dipropylene glycol, 1,4-butanediol, 1,6-hexanediol, glycerol, trimethylolpropane; pentaerythritol, sorbitol, sucrose, and mixtures thereof. The polyether polyols can be used individually or in the form of mixtures.

The polymeric compounds having at least two isocyanate-reactive hydrogen atoms (b) preferably comprise polyether polyols based on a difunctional starter molecule (b1) and polyether polyols based on a trifunctional starter molecule (b2).

The difunctional starter molecules used for preparation of constituent (b1) may, for example, be ethanediol, propanediol-1,2- and -1,3, diethylene glycol, dipropylene glycol, butanediol-1,4 or hexanediol-1,6 or mixtures thereof. Preference is given to using diethylene glycol or dipropylene glycol.

In general, the alkoxylation of constituent (b1) is executed in such a way that constituent (b1) has a number-average molecular weight of 500 g/mol to 3500 g/mol, preferably of 600 to 2500 g/mol, more preferably of 800 to 1500 g/mol.

The trifunctional starter molecules used for preparation of constituent (b2) are preferably glycerol, trimethylolpropane or mixtures thereof.

In general, the alkoxylation of constituent (b2) is executed in such a way that constituent (b2) has a number-average molecular weight of 500 g/mol to 8000 g/mol, preferably of 1000 to 6000 g/mol.

In a preferred embodiment, the polyol constituent (b2) comprises constituents (b2-1) and (b2-2), each of which is a polyether polyol based on a trifunctional starter molecule but with different molecular weight.

Constituent (b2-1) comprises a polyether polyol based on a trifunctional starter molecule having a number-average molecular weight of 500 g/mol to 3500 g/mol, preferably of 1000 to 3200 g/mol, more preferably of 1500 to 3000 g/mol, especially of 1800 to 2900 g/mol.

Constituent (b2-2) is typically a polyether polyol based on a trifunctional starter molecule having a number-average molecular weight of more than 3500 g/mol to 8000 g/mol be, preferably of 3700 to 7000 g/mol, more preferably of 4000 g/mol to 6000 g/mol.

In a further embodiment, the polymeric compounds having at least two isocyanate-reactive hydrogen atoms comprise, as an additional constituent b3), a polyether polyol based on a tetrafunctional or higher-functionality starter molecule. Preference is given to using tetra- to hexafunctional starter molecules. Examples of suitable starter molecules are pentaerythritol, sorbitol and sucrose.

The chain extenders and/or crosslinkers c) used may be substances having a molecular weight of less than 500 g/mol, more preferably of 60 to 400 g/mol, chain extenders having 2 isocyanate-reactive hydrogen atoms and crosslinkers having 3 isocyanate-reactive hydrogen atoms. These can be used individually or preferably in the form of mixtures. Preference is given to using diols and/or triols having molecular weights of less than 500, more preferably of 60 to 400 and especially 60 to 350. Examples of useful substances include aliphatic, cycloaliphatic and/or araliphatic or aromatic diols having 2 to 14, preferably 2 to 10, carbon atoms, such as ethylene glycol, 1,3-propanediol, 1,4-butanediol, 1,6-hexanediol, 1,10-decanediol and bis(2-hydroxyethyl)hydroquinone, 1,2-, 1,3-, 1,4-dihydroxycyclohexane, diethylene glycol, dipropylene glycol, tripropylene glycol, triols such as 1,2,4-, 1,3,5-trihydroxycyclohexane, glycerol and trimethyloipropane, and low molecular weight hydroxyl-containing polyalkylene oxides based on ethylene oxide and/or 1,2-propylene oxide and the aforementioned diols and/or triols as starter molecules. The crosslinkers (c) used are more preferably low molecular weight hydroxyl-containing polyalkylene oxides based on ethylene oxide and/or 1,2-propylene oxide, more preferably ethylene, and trifunctional starters, especially glycerol. The chain extender c) used is more preferably dipropylene glycol.

The polycarbonate polyols usable in accordance with the invention are prepared by known processes, for example as described in JP1998000267980 and U.S. 62/655,524. They are obtained, for example, by ester exchange reaction with an aliphatic diol and dimethyl carbonate. Polycarbonate polyols in the context of the invention preferably have number-average molecular weights of 500 to 2000 g/mol, more preferably 500 to 1000 g/mol, and functionalities of preferably 2 to 6 and more preferably 2 to 3. The polycarbonate polyols used may, for example, be commercially available polycarbonate polyols such as Eternacoll® UH 100, UH 50 or PH 200 from UBE Chemicals.

Preference is given to using components b1), b2) and c) and optionally b3) in such an amount that the viscosity of a mixture of these substances at 25° C., measured to DIN 53019, has less than 1000 mPas, preferably less than 500 mPas at 25° C. and more preferably from 200 to 400 mPas.

The mixture of polymeric compounds having at least two isocyanate-reactive hydrogen atoms (b) and chain extenders and/or crosslinkers (c) comprises preferably from 20 to 60% by weight, more preferably from 30 to 50% by weight, of component b1), from 20 to 60% by weight, more preferably from 30 to 50% by weight, of component b2), and 5 to 25% by weight, more preferably from 7 to 20% by weight and especially preferably from 9 to 18% by weight of chain extender and/or crosslinker c), based in each case on the total weight of components (b) and (c).

If constituent b3) is used, the amount used is generally 0.1 to 15% by weight, preferably 1 to 10% by weight and more preferably 2 to 7% by weight, based on the total weight of components (b) and (c). Component b) preferably comprises no further polymeric compounds having isocyanate-reactive hydrogen atoms aside from components b1), b2) and b3).

The catalysts (d) used for production of the polyurethane moldings are preferably compounds which significantly accelerate the reaction of the compounds comprising hydroxyl groups of component (b) and optionally (c) with the organic, optionally modified polyisocyanates (a). Examples include amidines such as 2,3-dimethyl-3,4,5,6-tetrahydropyrimidine, tertiary amines such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyl- and N-ethyldiethanolamine and dimethylethanolamine. Likewise useful are organic metal compounds, preferably organic tin compounds, such as tin(II) salts of organic carboxylic acids, e.g. tin(II) acetate, tin(II) octoate, tin(II) ethylhexoate and tin(II) laurate, and the dialkyltin(IV) salts of organic carboxylic acids, for example dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or mixtures thereof. The organic metal compounds can be used alone or preferably in combination with strongly basic amines. If component (b) comprises an ester, preference is given to using exclusively amine catalysts.

Preference is given to using 0.001 to 5% by weight, especially 0.05 to 2% by weight, of catalyst or catalyst combination, based on the weight of component (b).

Waxes (e) refer to substances which are kneadable or solid to brittly hard at 20° C., have a crystalline to semicrystalline structure at 20° C., melt without decomposition at temperatures of 25 to 180° C., preferably 30 to 100° C., have a viscosity of less than 1000 mPas 10° C. above the melting point, and are polishable under slight pressure.

Examples of waxes (e) are natural waxes which comprise or consist of, for example, esters of organic acids having 7 to 100 carbon atoms, for example fatty acids, with long-chain primary alcohols, for example having 5 to 150 carbon atoms, chemically modified waxes and synthetic waxes. Examples of natural waxes are cotton wax, carnauba wax, candelilla wax, esparto wax, guaruma wax, japan wax, cork wax, montan wax, ouricury wax, rice bran wax, sugarcane wax, beeswax, uropygial grease, wool wax, shellac wax, spermaceti, micro waxes, ceresin and ozokerite. Examples of chemically modified waxes are hydrogenated jojoba waxes, montan wax or Sasol waxes. Examples of synthetic waxes are polyalkylene waxes such as polyolefin waxes, polyethylene waxes and polypropylene waxes, polyethylene glycol waxes and amide waxes. The waxes used are preferably synthetic waxes, especially polyethylene waxes.

The waxes (e) preferably have a weight-average molecular weight of 200 to 5000 g/mol, preferably 300 to 5000 g/mol.

By specific selection of the wax or of a combination of waxes, the desired phase transition or phase transition region can be matched to the requirements. For example, the wax may be selected such that the maximum release of heat in the course of cooling is effected at a temperature slightly above the solidification temperature of the material conveyed in the pipeline, for example the crude oil produced. Thus, a maximum extension of the free-flow time of the material conveyed can be achieved. If combinations of waxes are used, these may, for example, be present separately or together in one or more dispersions, or be metered separately or together to the mixing head.

These waxes (e) are preferably dispersed in at least one relatively high molecular weight compound having at least two isocyanate-reactive hydrogens (b). A process for producing such wax dispersions is described, for example, in WO 2009/138379.

A wax dispersion is understood in the context of the invention to mean the stable distribution of a wax (e) as a dispersed phase in a dispersant, optionally using an emulsifier. "Stable" in this context means that the dispersion does not separate at room temperature within 24 hours, preferably within one week and more preferably within 4 weeks and especially within 8 weeks. The dispersed phase has a mean particle diameter of 0.01 µm to 1000 µm, preferably 0.1 µm to 100 µm and especially 0.5 µm to 20 µm. At least 80% by weight of the particles of the dispersed phase are within the particle size range from 0.01 µm to 500 µm. Such dispersions are described, for example, in WO 2009/138379.

Preference is given to using an emulsifier; optionally, especially at relatively low wax concentrations and/or in the case of use of polar waxes comprising, for example, polar groups such as OH groups, acid groups or amine groups, it is also possible to dispense with the use of the emulsifier. The emulsifier used may be any emulsifying compound which leads to the abovementioned dispersion. These dispersants are preferably copolymers having molecular moieties compatible with the wax used and molecular moieties compatible with the dispersed phase.

The emulsifier used is preferably a copolymer (C) having a functionality with respect to isocyanate of at least one and a molecular weight of 15 000 to 500 000 g/mol. The copolymer (C) is preferably formed from at least one α,β-ethylenically unsaturated monomer and at least one unsaturated polyether polyol. These copolymers or dispersions of the copolymers in polyether or polyesterol are liquid at 80° C. The copolymer (C) in the context of the present invention is not counted among the polymeric compounds having isocyanate-reactive hydrogen atoms (b).

In a preferred embodiment, the at least one α,β-ethylenically unsaturated monomer corresponds to the general formula (I)

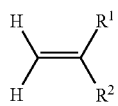

(I)

in which
R$^1$ is C$_1$-C$_{30}$-alkyl, C$_2$-C$_{30}$-alkenyl, C$_2$-C$_{30}$-alkynyl, C$_1$-C$_{30}$-heteroalkyl, substituted or unsubstituted C$_5$-C$_{30}$-aryl, substituted or unsubstituted C$_5$-C$_{30}$-heteroaryl or functional group selected from —(C=O)—O—R$^3$ and —(C=O)—NH—R$^4$ where R$^3$ and R$^4$ are each selected from H, C$_1$-C$_{30}$-alkyl, C$_2$-C$_{30}$-alkenyl, C$_2$-C$_{30}$-alkynyl, C$_1$-C$_{30}$-heteroalkyl, substituted or unsubstituted C$_5$-C$_{30}$-aryl, substituted or unsubstituted C$_5$-C$_{30}$-heteroaryl and
R$^2$ is H, C$_1$-C$_{30}$-alkyl, C$_2$-C$_{30}$-alkenyl, C$_2$-C$_{30}$-alkynyl, C$_1$-C$_{30}$-heteroalkyl, substituted or unsubstituted C$_5$-C$_{30}$-aryl or substituted or unsubstituted C$_5$-C$_{30}$-heteroaryl.

Preferably, in general formula (I),
R$^1$ is substituted or unsubstituted C$_5$-C$_{30}$-aryl, for example benzyl or naphthyl, substituted or unsubstituted C$_5$-C$_{30}$-heteroaryl or functional group selected from —(C=O)—O—R$^3$ and —(C=O)—NH—R$^4$ where R$^3$ and R$^4$ are each selected from C$_1$-C$_{30}$-alkyl, especially C$_{12}$-C$_{30}$-alkyl, or C$_2$-C$_{30}$-alkenyl, especially C$_{12}$-C$_{30}$-alkenyl, and
R$^2$ is H, C$_1$-C$_{12}$-alkyl, for example methyl, ethyl, propyl, butyl.

Heteroatoms are, for example, selected from N, O, P, S.

In a very particularly preferred embodiment, the α,β-ethylenically unsaturated monomer is selected from the group consisting of styrene, α-methylstyrene, acrylonitrile, acrylates, acrylic esters or methacrylic esters or acrylamides or methacrylamides of saturated fatty acids, for example lauric acid C$_{11}$H$_{23}$COOH, tridecanoic acid C$_{12}$H$_{25}$COOH, myristic acid C$_{13}$H$_{27}$COOH, pentadecanoic acid C$_{14}$H$_{29}$COOH, palmitic acid C$_{15}$H$_{31}$COOH, margaric acid C$_{16}$H$_{33}$COOH, stearic acid C$_{17}$H$_{35}$COOH, nonadecanoic acid C$_{18}$H$_{37}$COOH, arachic acid C$_{19}$H$_{39}$COOH, behenic acid C$_{21}$H$_{43}$COOH, lignoceric acid C$_{23}$H$_{47}$COOH, cerotic acid C$_{25}$H$_{51}$COOH, melissic acid C$_{29}$H$_{59}$COOH, tuberculostearic acid i-C$_{18}$H$_{37}$COOH, or unsaturated fatty acids, for example palmitoleic acid C$_{15}$H$_{29}$COOH, oleic acid C$_{17}$H$_{33}$COOH, erucic acid C$_{21}$H$_{41}$COOH, linoleic acid C$_{17}$H$_{31}$COOH, linolenic acid C$_{17}$H$_{29}$COOH, eleostearic acid C$_{17}$H$_{29}$COOH, arachidonic acid C$_{19}$H$_{31}$COOH, clupanodonic acid C$_{21}$H$_{33}$COOH, docosahexaenoic acid C$_{21}$H$_{31}$COOH, and mixtures thereof.

In a preferred embodiment, the unsaturated polyether polyol present in the copolymer (C) is an unsaturated polyaddition product of at least one polyhydric alcohol, for example sugars, such as hydrolyzed starch, glucose syrup, sorbitol, sucrose, pentaerythritol, dipentaerythritol, tripentaerythritol, glycerol, trimethylolpropane, a polyfunctional amine, for example ethylenediamine, diethylenetriamine, 1,3-propylenediamine, 1,3-butylenediamine, 1,4-butylenediamine, 1,2-, 1,4-, 1,5- and 1,6-hexamethylenediamine, phenylenediamine, 2,3-, 2,4- and 2,6-tolylenediamine, vicinal tolylenediamines, 4,4'-, 2,4'- and 2,2'-diaminodiphenylmethane, alkanolamine such as ethanolamine, N-methyl- and N-ethylethanolamine, diethanolamine, N-methyl-, N-ethyldiethanolamine, triethanolamine, ammonia, condensates of acetone or formaldehyde with phenol or polyfunctional alcohols derived from polymers formed from hydroxy-functional monomers, such as polymers formed from hydroxyethyl acrylate, hydroxymethyl acrylate, hydroxyethyl methacrylate, hydroxymethyl methacrylate, hydroxypropyl acrylate, hydroxypropyl methacrylate or copolymers of these monomers, at least one alkylene oxide, for example ethylene oxide, propylene oxide, butylene oxide and/or pentylene oxide, and at least one unsaturated monomer, for example styrene or α-methylstyrene substituted by at least one isocyanate group, especially meta-isopropenylbenzyl isocyanate, for example acrylic acid, acryloyl chloride, methacrylic acid, methacryloyl chloride, fumaric acid, maleic anhydride, vinylically unsaturated epoxides, for example acryloyl glycidyl ether, methacryloyl glycidyl ether.

Very particularly preferred copolymers (C) are, for example copolymers of butyl acrylate, styrene, an unsaturated polyether polyol formed from sorbitol, propylene oxide, ethylene oxide and meta-isopropenylbenzyl isocyanate (mass ratio 1:1:1), copolymers of butyl acrylate, styrene, an unsaturated polyether polyol formed from sorbitol, propylene oxide, ethylene oxide and meta-isopropenylbenzyl isocyanate (mass ratio 1:2:1), copolymers of butyl acrylate, styrene, an unsaturated polyether polyol formed from sorbitol, propylene oxide, ethylene oxide and meta-isopropenylbenzyl isocyanate (mass ratio 2:2:1), copolymers of butyl acrylate, styrene, an unsaturated polyether polyol formed from sorbitol, propylene oxide, ethylene oxide and meta-isopropenylbenzyl isocyanate (mass ratio 4:4:1), copolymers of butyl acrylate, styrene, an unsaturated polyether polyol formed from sorbitol, propylene oxide, ethylene oxide and meta-isopropenylbenzyl isocyanate (mass ratio 4:4:1), copolymers of butyl acrylate, styrene, an unsaturated polyether polyol formed from sorbitol, propylene oxide, ethylene oxide and meta-isopropenylbenzyl isocyanate (mass ratio 4:4:1) with low molecular weight, copolymers of styrene, an unsaturated polyether polyol formed from sorbitol, propylene oxide, ethylene oxide and meta-Isopropenylbenzyl isocyanate (mass ratio 8:1), copolymers of butyl acrylate, styrene, an unsaturated polyether polyol formed from sorbitol, propylene oxide, ethylene oxide and meta-isopropenylbenzyl isocyanate (mass ratio 8:8:1) with low molecular weight, copolymers of styrene, stearyl acrylate, an unsaturated polyether polyol formed from sorbitol, propylene oxide, ethylene oxide and meta-isopropenylbenzyl isocyanate (mass ratio 1:1:1), copolymers of stearyl acrylate, an unsaturated polyether polyol formed from sorbitol, propylene oxide, ethylene oxide and meta-isopropenylbenzyl isocyanate (mass ratio 1:1:1), copolymers of butyl acrylate, stearyl acrylate, an unsaturated polyether polyol formed from sorbitol, propylene oxide, ethylene oxide and meta-isopropenylbenzyl isocyanate (mass ratio 1:1:1), copolymers of stearyl acrylate, hydroxyethyl acrylate, an unsaturated polyether polyol formed from hydroxyethyl acrylate, diisocyanate and polyether polyol, copolymers of stearyl acrylate, hydroxypropyl acrylate, an unsaturated polyether polyol formed from hydroxyethyl acrylate, diisocyanate and polyether polyol, copolymers of stearyl acrylate, styrene and an unsaturated polyether polyol formed from hydroxyethyl acrylate, diisocyanate and polyether polyol, copolymers of stearyl acrylate, acrylonitrile and an unsaturated polyether polyol formed from hydroxyethyl acrylate, diisocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, an unsaturated polyether polyol formed from hydroxyethyl acrylate, diisocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, styrene, an unsaturated polyether polyol formed from hydroxyethyl acrylate, diisocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, acrylonitrile, an unsaturated polyether polyol formed from hydroxyethyl acrylate, diisocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, an unsaturated polyether polyol formed from meta-isopropenylbenzyl isocyanate and polyether polyol, copolymers of unsaturated fatty alcohol ($C_{12}$-$C_{30}$) formed from fatty alcohol ($C_{12}$-$C_{30}$) and meta-isopropenylbenzyl isocyanate, styrene, an unsaturated polyether polyol formed from meta-isopropenylbenzyl isocyanate and polyether polyol. Especially preferred are copolymers of styrene, stearyl acrylate and an unsaturated polyether polyol formed from sorbitol, propylene oxide, ethylene oxide and meta-isopropenylbenzyl isocyanate. Preferred unsaturated polyetherols for formation of the copolymer (C) have a functionality of 2 to 8 and a number-average molecular weight of 2000 g/mol to 50 000 g/mol.

These polymers suitable as copolymers (C) in accordance with the invention preferably have a molecular weight in the range from 15 000 to 1 000 000 g/mol, more preferably from 20 000 to 200 000, especially from 30 000 to 80 000 g/mol. The molecular weights are typically determined by means of GPC; the standard used is polystyrene. This copolymer (C) is soluble in the compound (b) and does not form a thermoset shell around wax particles. For production of the dispersion using the copolymer (C), the copolymer (C) is added to the compound (b) as an independent component together with wax (e).

If used, the emulsifier is preferably used at 0.5 to 40% by weight, more preferably 1 to 30% by weight, based in each case on the weight of the wax used.

The proportion of the wax, based on the total weight of the relatively high molecular weight compound b), of the chain extender and/or crosslinker c) and of the wax dispersion e), is preferably 1 to 70% by weight, more preferably 5 to 60 and especially 10 to 50% by weight. If the wax is dispersed in the polymeric compounds having isocyanate-reactive hydrogen atoms (b), preference is given to not using any further dispersants.

Optionally, assistants and additives (f) may be added to the mixture of components a) to e). Examples here include surface-active substances, dyes, pigments, hydrolysis stabilizers, oxidation stabilizers, UV stabilizers and hollow microspheres.

The term "hollow microspheres" in the context of this invention is understood to mean organic and mineral hollow spheres. The organic hollow spheres used may, for example, be hollow polymer spheres, for example made from polyethylene, polypropylene, polyurethane, polystyrene or a mixture thereof. The mineral hollow spheres may, for example, comprise clay, aluminum silicate, glass or mixtures thereof.

The hollow spheres may have a vacuum or partial vacuum within, or be filled with air, inert gases, for example nitrogen, helium or argon, or reactive gases, for example oxygen.

Typically, the organic or mineral hollow spheres have a diameter of 1 to 1000 μm, preferably of 5 to 200 μm. Typically, the organic or mineral hollow spheres have a bulk density of 0.1 to 0.4 g/cm$^3$. They generally have a thermal conductivity of 0.03 to 0.12 W/mK.

The hollow microspheres used are preferably hollow glass microspheres. In a particularly preferred embodiment, the hollow glass microspheres have a hydrostatic pressure resistance of at least 20 bar. For example, the hollow glass microspheres used may be 3M—Scotchlite® Glass Bubbles. The mixture of components a) to f) preferably does not comprise any hollow glass microspheres.

In addition, thixotropic additives, for example Laromin® C 260 (dimethylmethylenebiscyclohexylamine), may be present as assistants and additives (f). In general, the amount of these thixotropic additives used is between 0.1 and 3 parts by weight, based on 100 parts by weight of component (b).

In addition, it is possible to add blowing agents known from the prior art as assistants and additives (f). However, it is preferable that no blowing agent is used, and more particularly that no water is added. Thus, components a) and b) more preferably do not comprise any blowing agent apart from residual water present in industrially produced polyols.

In addition, it is especially preferable when the residual water content is reduced by addition of water scavengers. Suitable water scavengers are, for example, zeolites. These water scavengers are used, for example, in an amount of 0.1 to 10% by weight, based on the total weight of the polyol component b).

If, as described above, no blowing agents are used, compact polyurethanes and not polyurethane foams are obtained as the inventive product.

To prepare the inventive polyurethane reaction mixture, the organic polyisocyanates a) and the components comprising compounds isocyanate-reactive hydrogen atoms are reacted in such amounts that the equivalents ratio of NCO groups of the isocyanate groups to the sum total of the reactive hydrogen atoms is 1:0.5 to 1:3.50 (corresponding to an isocyanate index of 50 to 350), preferably 1:0.85 to 1:1.30 and more preferably from 1:0.9 to 1:1.15.

The starting components are typically mixed and reacted at a temperature of 0° C. to 100° C., preferably 15° C. to 60° C. The mixing can be effected with the customary PUR processing machines. In a preferred embodiment, the mixing is effected by low-pressure machines or high-pressure machines.

The reaction mixture of components (a), (b), (d), (e) and optionally (c) and (f) is applied to a pipe and left to react. The pipes used are generally pipes as used customarily in oil production, especially in the offshore sector. In the context of this invention, these also comprise other pipe-like elements used in oil production, especially in the offshore sector, such as pipe nuts for connection of two pipes, well connections or pipe collectors.

Such a pipe may be an uncoated steel pipe, but it is also possible to use pipes which already have one or more layers of coating. Preferably, in the context of the present invention, the steel pipe is coated directly with the inventive first polyurethane reaction mixture. Alternatively, the inventive first polyurethane reaction mixture, for example, can also be applied to a powder sprayed fusion-bonded epoxy- or polypropylene-coated pipe. Subsequently, the first polyurethane reaction mixture is cured to give a first polyurethane layer, optionally with heat treatment, for example by irradiation or in an oven.

In a first embodiment, the first reaction mixture is applied by pouring onto the rotating pipe. This embodiment is referred to as the rotary casting method. In this case, the first reaction mixture is obtained by means of conventional mixing apparatus, for example a low-pressure mixing head. The advance rate of the mixing head or of the pipe is generally adjusted such that the desired thickness of the first polyurethane layer is attained with constant expulsion. For this purpose, the reaction mixture preferably comprises thixotropic additives, which prevent the reaction mixture from dripping off the rotating pipe.

In a second embodiment, the first reaction mixture is applied by what is called mold casting. This involves introducing the first reaction mixture into a closed mold, which under some circumstances is also heated, in which the inner pipe (i) (frequently also referred to as medium pipe) is embedded. The space between the medium pipe and the mold wall is filled completely with the first reaction mixture. After the curing of the polyurethane reaction mixture, the mold is removed, and the ready-coated tube is present. It is important here that the mold is filled completely without air pockets.

The filling operation can be effected below the liquid level, and also from above. In this context, for process technology reasons, preference is given to dispensing with a thixotropic additive since the reaction mixture must remain free-flowing in order to actually be able to completely fill the mold.

The thickness of the first polyurethane layer is preferably 5 to 200 mm, more preferably 10 to 150 mm and especially 20 to 100 mm. This comprises the wax (e) in dispersed form. The mean particle size of the dispersed wax particles is 0.01 µm to 1000 µm, preferably 0.1 µm to 500 µm, more preferably 0.5 µm to 100 µm and especially 0.5 µm to 20 µm. Preferably, at least 80% by weight of the wax particles (e) are within the particle size range from 0.01 µm to 500 µm, more preferably 0.1 to 100 µm.

Optionally, one or more further layers, for example an insulating layer and/or an outer layer of a thermoplastic, may be applied to the first polyurethane layer.

In a preferred embodiment, the application of the first reaction mixture is followed by application of a further polyurethane reaction mixture to the pipe. In this case, the first reaction mixture may not yet have discarded fully, or else may already have reacted fully to give the first polyurethane layer. The second polyurethane reaction mixture too may be applied directly to the first polyurethane layer or else to any intermediate layer present. The second polyurethane reaction mixture used is preferably a polyurethane reaction mixture comprising the above-described components (a) to (f) except for component (e). The second polyurethane reaction mixture preferably comprises hollow microspheres. More particularly, the composition of the second polyurethane reaction mixture corresponds to the composition of the first polyurethane reaction mixture, except that no wax dispersion (f) is present in the second polyurethane reaction mixture. At the same time, the second polyurethane reaction mixture preferably comprises hollow microspheres. In this embodiment, the pipe may comprise a further coating, for example a final coating of a thermoplastic material as generally used as an outer layer in pipeline construction.

The present invention further provides a pipeline with heat-storing properties obtainable by a process according to the invention. This pipeline is preferably an offshore pipeline which is used for production of crude oil at sea. A pipeline in the context of the present invention shall be understood to mean not just conventional coated pipes but also weld regions coated with inventive polyurethane in pipelines, called "field joints", and polyurethane-coated articles associated with pipelines, such as muffs, well connections, wellhead trees, pipe collectors, pumps and buoys. In addition "pipeline" in the context of the present invention also includes pipeline pipes having sheathing for reinforcement, such as bend stiffeners or bend restrictors, the bend stiffeners and bend restrictors corresponding to the inventive polyurethane coating. More preferably, the inventive polyurethane-coated conduction element is a polyurethane-coated pipe of an offshore pipeline, a field joint of an offshore pipeline or a wellhead tree (also called Xmas tree) of an offshore pipeline, especially of an offshore pipeline for production of crude oil.

The invention is to be illustrated by examples which follow.

Starting Materials

Polyol: polytetrahydrofuran polyol with OH number 106-118 and predominantly primary OH groups
CE1: 1,4-butanediol
Cat1: 1-methylimidazole
AD1: MSA antifoam
AD2: K—Ca—Na zeolite
AD3: encapsulated MPCM 37D from Mikrotek
AD4: Luwax V wax, from BASF SE
AD5: Paraffin 51-53, from Merck
AD6: copolymer consisting of stearyl acrylate, styrene, Lupranol 4800 N, dispersed with dodecanethiol in Lupranol 2095
AD7: commercial comparative emulsifier, Z 6020 Silane from Dow Corning
Iso1: aliphatic isocyanurate-modified hexamethylene diisocyanate (HDI) "Basonat HI 100" from BASF having an NCO content of 22%

According to table 1, polyol, chain extender, catalyst and the additives (AD) specified were mixed to give the polyol component (also referred to as A component) and heated to 70° C. while stirring. The isocyanate component was likewise heated to 70° C. and reacted with the polyol component with stirring time 1 min. The reaction mixture was cured in a heating cabinet at 70° C. for 30 min.

The amount of PCM is based on the amount of PCM without the presence of any shell resulting from the encapsulation, based on the total weight b of the polyol component. The time gained before the cooling was measured at the crystallization temperature of the PCM. For this purpose, a cylindrical specimen of the same length and diameter with a thermocouple wire insulated in the middle of the specimen was produced. The signals from the thermocouple wire were read out with a temperature recorder. The specimen was incubated in a heated cabinet and the heating curve was recorded up to the temperature of the heating cabinet of 140° C., then the test specimen was placed into a waterbath at a temperature of 4° C. and the cooling curve was recorded correspondingly. Specimens were produced from polyurethanes according to comparative examples 1 and 2 and examples 1 to 6, and the curves thereof were recorded. At the phase transition at the solidification temperature of the waxes, the time delay in the cooling curve was determined.

In all cases, the inventive emulsifier gives homogeneous material with phase change properties. If the encapsulated PCM material is dispersed, the reaction mixture has a high viscosity. Owing to the mass of the encapsulation material, the effective storage capacity for heat is smaller, which is shown by the short time before cooling below the solidifi-

TABLE 1

| | Comparative 1 | Comparative 2 | Comparative 3 | Comparative 4 | Comparative 5 | Comparative 6 | Comparative 7 | Example 1 | Example 2 | Example 3 | Example 4 |
|---|---|---|---|---|---|---|---|---|---|---|---|
| Polyol | 81.95 | 81.95 | 81.95 | 81.95 | 81.95 | 81.95 | 81.95 | 81.95 | 81.95 | 81.95 | 81.95 |
| CE1 | 15 | 15 | 15 | 15 | 15 | 15 | 15 | 15 | 15 | 15 | 15 |
| Cat1 | 0.05 | 0.05 | 0.05 | 0.05 | 0.05 | 0.05 | 0.05 | 0.05 | 0.05 | 0.05 | 0.05 |
| AD1 | 0.5 | 0.5 | 0.5 | 0.5 | 0.5 | 0.5 | 0.5 | 0.5 | 0.5 | 0.5 | 0.5 |
| AD2 | 2.5 | 2.5 | 2.5 | 2.5 | 2.5 | 2.5 | 2.5 | 2.5 | 2.5 | 2.5 | 2.5 |
| Σ | 100 | 100 | 100 | 100 | 100 | 100 | 100 | 100 | 100 | 100 | 100 |
| AD 3 | 50 | 20 | 0 | 0 | 0 | 0 | 0 | 0 | 0 | 0 | 0 |
| AD 4 | 0 | 0 | 0 | 0 | 0 | 20 | 10 | 10 | 20 | 50 | 0 |
| AD5 | 0 | 0 | 20 | 20 | 10 | 0 | 0 | 0 | 0 | 0 | 20 |
| AD 6 | 0 | 0 | 0 | 0 | 0 | 0 | 0 | 4 | 4 | 12 | 4 |
| AD 7 | 0 | 0 | 0 | 4 | 0 | 0 | 0 | 0 | 0 | 0 | 0 |
| ISO1 | 100 | 100 | 100 | 100 | 100 | 100 | 100 | 100 | 100 | 100 | 100 |
| Index | 100 | 100 | 100 | 100 | 100 | 100 | 100 | 100 | 100 | 100 | 100 |
| Material | + | + | − | − | − | − | o | + | + | + | + |
| Viscosity [mPas] | 5083 | 332 | | | | | n.a. | 186 | 273 | 2736 | n.a. |
| Amount of PCM | 45% | 18% | | | | | 5% | 10% | 20% | 50% | 20% |
| Time gained before cooling to $T_{phase\ transition}$[S] | 724 (32° C.) | 289 (32° C.) | | | | | n.a. | 288 (35° C.) | 564 (35° C.) | 1520 (35° C.) | 646 (40° C.) |

The material properties were assessed visually. "+" represents homogeneous material and "−" inhomogeneous material. In this case, the wax dissolves from the surface. In the polyurethane remaining, no effect resulting from the phase transition of wax can be detected. In the case of use of 10% by weight of the polar polyether wax Luwachs V wax from BASF in comparative experiment 7, a material in which small portions of the wax were able to become incorporated by reaction was obtained. In addition, however, a wax film also formed as a result of excess wax, unreacted wax on the surface.

The viscosity figure is based on the viscosity of the polyol component at 75° C. by means of viscometry in a rheometer in rotation mode with plate-plate configuration.

cation point of the PCM (40° C.). The melt-emulsified PCM allows dispersion of a greater amount of wax, the viscosity of the A component still being lower than in the case of the encapsulated PCMs. Owing to the greater amount of latent heat stores, there is an increase in the time before cooling below the solidification temperature of the wax. In the case of use of another wax (paraffin) with higher storage capacity and use of smaller amounts of the wax, the viscosity of the isocyanate-reactive mixture remains much lower, but the time before cooling of the PU material below the solidification point of the wax (40° C.) can be significantly increased. The viscosity of the polyol component using different amounts of encapsulated PCM and emulsified PCM is shown in table 2.

TABLE 2

Comparison of processabilities as a function of the
viscosity of the systems at 75° C. in each case
with equal proportions of AD3 and AD 4 PCM material

| Percent by mass of PCM content | Viscosity with AD 3 | Viscosity with AD 4 |
|---|---|---|
| 0 | 141 | 140 |
| 10 | 198 | 186 |
| 20 | 332 | 273 |
| 35 | 1187 | 828 |
| 55 | 6086 | 3276 |

The invention claimed is:

1. A process for producing pipelines with heat-storing properties, comprising
mixing
a) an organic polyisocyanate with
b) at least one polymeric compound having at least two isocyanate-reactive hydrogen atoms,
c) optionally a chain extender and/or a crosslinker,
d) a catalyst,
e) and an unencapsulated wax, and
f) optionally other assistants and/or additives,
to give a first reaction mixture comprising wax droplets, and applying the first reaction mixture to a pipe, optionally previously coated, and allowing the applied first reaction mixture to react fully to yield wax particles dispersed in a polyurethane layer such that the dispersed wax particles latently store heat that is released upon solidification of the dispersed wax particles,
wherein the first reaction mixture does not include an encapsulated wax.

2. The process according to claim 1, wherein the wax particles dispersed in the polyurethane layer have a mean particle size of 0.01 μm to 500 μm.

3. The process according to claim 1, wherein the unencapsulated wax is a polyethylene wax.

4. The process according to claim 1, wherein the unencapsulated wax (e) is molten when mixed with components (a) to (d) and optionally (f).

5. The process according to claim 4, wherein the wax (e) is mixed with components (a) to (d) and optionally (f) in a high-pressure mixing pot.

6. The process according to claim 1, wherein the polymeric compound having at least two isocyanate-reactive hydrogen atoms comprises b1) polyetherols based on a difunctional starter molecule and b2) polyetherols based on a trifunctional starter molecule.

7. The process according to claim 6, wherein b1) is in an amount of 20 to 60% by weight, b2) is in an amount of 20 to 60% by weight, and the chain extenders and/or the crosslinkers c) are mixed in an amount of 5 to 25% by weight, based in each case on the total weight of components b) and c).

8. The process according to claim 1, further comprising applying, after the applying the first reaction mixture, at least one further polyurethane reaction mixture comprising hollow microspheres to the pipe.

9. The process according to claim 8, wherein the at least one further polyurethane reaction mixture is applied directly on the first reaction mixture that has not yet fully reacted.

10. The process according to claim 8, wherein the at least one further polyurethane reaction mixture is applied directly on the first reaction mixture that has fully reacted.

* * * * *